235-382

SR

6/30/87 XR 4,677,284

United States Patent [19]

Genest

[11] Patent Number: 4,677,284

[45] Date of Patent: Jun. 30, 1987

[54] MULTI-ACCESS SECURITY SYSTEM

[76] Inventor: Leonard J. Genest, 1331 E. Edinger Ave., Santa Ana, Calif. 92705

[21] Appl. No.: 768,293

[22] Filed: Aug. 22, 1985

[51] Int. Cl.[4] ........ G06K 19/00

[52] U.S. Cl. ........ 235/487; 235/382; 340/825.31

[58] Field of Search ........ 235/382, 487, 441, 489; 340/825.31

[56] References Cited

U.S. PATENT DOCUMENTS

Re. 29,259 6/1977 Sabsay ........ 340/825.31 X
3,598,964 8/1971 Dell et al. ........ 235/382
3,781,805 12/1973 O'Neal ........ 235/382
4,237,376 12/1980 Giacomotti et al. ........ 235/487
4,602,150 7/1986 Nishikawa et al. ........ 235/382

*Primary Examiner*—David L. Trafton
*Attorney, Agent, or Firm*—Nilsson, Robbins, Dalgarn, Berliner Carson & Wurst

[57] ABSTRACT

A security system having a key card with combination codes encoded on two different ends of the key card to allow the user of the key card access to at least two different locks, each lock having different combination codes. The system includes a lock having a multi-level memory for storing combination codes with each level identified by an identification code. Each end of the key has at least one identification code and one combination code.

4 Claims, 3 Drawing Figures

MULTI-ACCESS SECURITY SYSTEM

BACKGROUND OF THE INVENTION

The present invention generally relates to an electronic security system and, more particularly, to a system which has at least one electronic user key having combination codes on two ends of the user key thereby allowing the user key access to at least two different locks.

Presently, there are many electronic lock systems which employ an encoded key card. Typically the key card has a code combination encoded on one end. If the code combination on the key matches the code combination in the lock a certain function is performed by the lock, such as opening the lock mechanism. The key card can also be encoded with a second code combination on the same end so that the code combination in the lock can be updated by replacing the lock code combination with the second key code combination. Such a security system is described in U.S. Pat. No. 4,283,710 to Genest.

The invention disclosed by Genest in U.S. Pat. No. 4,283,710 describes a security system with a lock having multi-level memories with each level identified by an identification code. Thus, a number of locks may have the same code combination at a certain memory level, thereby allowing a single type of key to open a plurality of locks. A particular application for this may be for a maid to service a certain floor or the hotel manager to have a "master" key to open every lock in the hotel. However, the guest key will only open one room. For example, at level 1 of the memory, each lock would have a different code combination. At level 2 memory, the code combinations for an entire floor would be the same thus allowing the maid to service each of the rooms on the individual floor. All the code combinations of level 3 memory would be the same, thus allowing the manager to open all the locks in the hotel.

Therefore, the locks described above have multiple memories to allow different keys to open the same door. However, the security system described does not allow two different locks, each with different code combinations, to be opened by the same key. For example, it may be desired to allow a guest to have access to the hotel room and a fire exit or any other common area. Such a common area could be locked, and therefore require a certain lock code combination to open it. All the lock code combinations for every room on the floor could be placed within the memory of the lock for the common area. However, this would be very impractical.

Therefore, there is a current need for a security system which would allow a single user key to access more than one door where each door lock has a different lock code combination.

SUMMARY OF THE INVENTION

A security system includes a plurality of locks and at least one electronic user key. The user key has an identification code on each of two ends and a combination code on each of the two ends.

In one embodiment, each lock has a device for receiving the user key, multiple memory levels for storing lock code combinations in each memory level, identification codes stored in each memory for identifying keys allowed to access each memory level, and a device for comparing a selected lock code with a code from the key input through the receiving device.

In another embodiment, each lock has a memory for storing a table of predefined operations with each predefined operation identified by a function code.

DETAILED DESCRIPTION OF THE PREFERRED EMBODIMENT

The present invention is an electronic security system which includes at least one electronic key card having two sets of different codes on two different ends of the card, thereby allowing the single card access to different locks, each lock having different code combinations.

Figure 1:
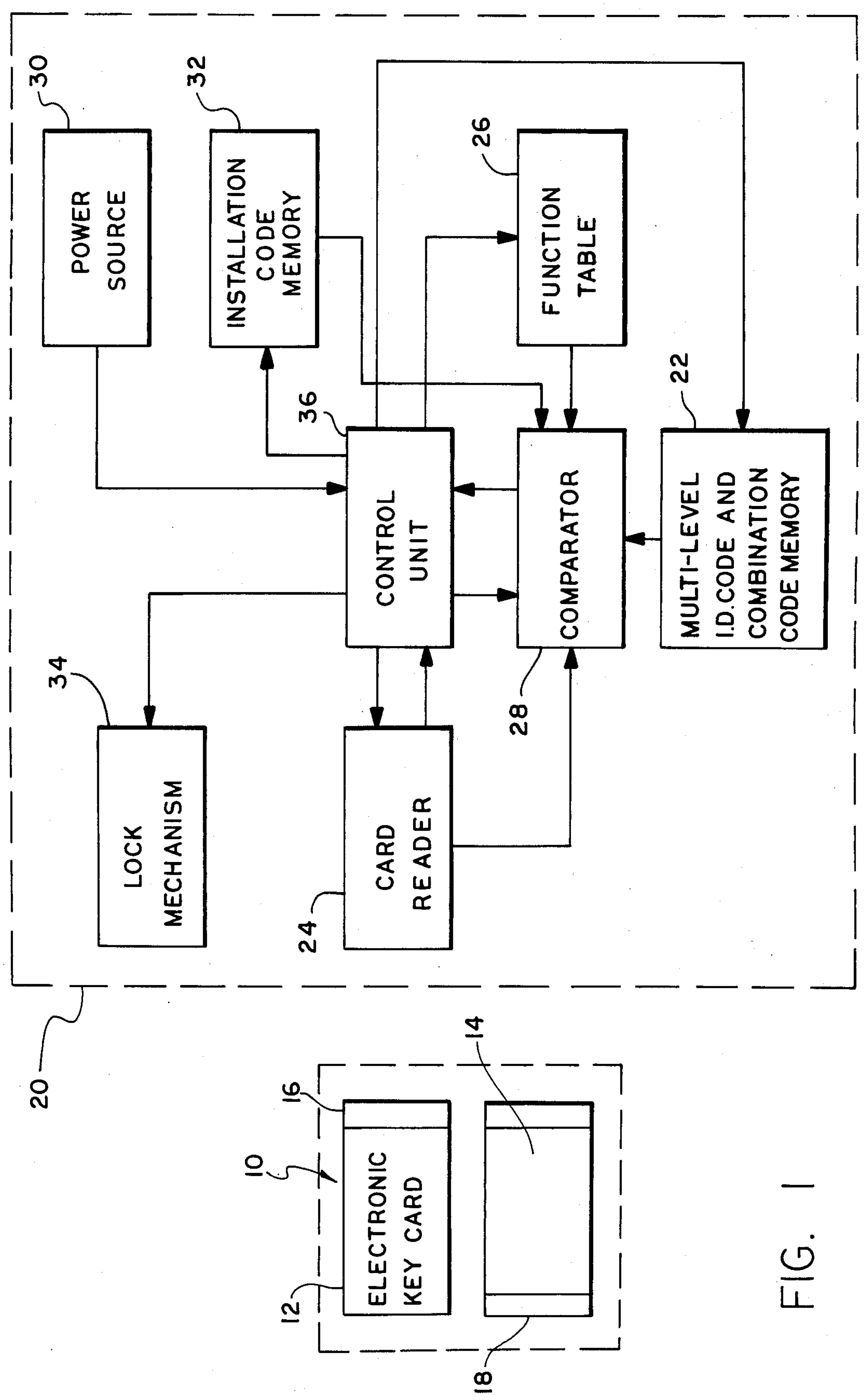
FIG. 1 is a block diagram showing the various relationships of the various elements of the present invention.

Referring to FIG. 1, an electronic key card 10 has a front 12 and a back 14. A first set of data is encoded on a first end 16 on the front 12 of the key card 10. A second set of data is encoded on a second end 18 on the back 14 of the key card 10. The lock 20 includes a multi-level memory 22 with each level identified by an identification code. A combination code is stored at each memory level in memory 22. The first set of data encoded on the first end 16 on the front 12 of key card 10 comprises a first identification code and a first combination code. The second set of data encoded on the second end 18 on the back 14 of key card 10 comprises a second identification code and a second combination code. The data encoded on the key card 10 is read into the lock 20 by card reader 24. The lock 20 may perform a number of predefined functons, such as opening the lock, changing the codes in multi-memory 22 or erasing the codes in multi-level memory 22. The predefined functions are stored in a function table 26 with each predefined function identified by a function code which are also stored in function table 26.

The lock 20 includes a comparator 28 for compraring the inputs to each other. Power for the lock 20 is provided by power source 30. The lock 20 includes an installation code memory 32 for storing an installation code. The installation code is a code which must be matched before a function may be performed. Control unit 36 controls the activity of all the electronic components as described above in the lock 20.

According to the convention for the flow diagram herein, the diagonal shaped blocks represent information to be supplied or a question asked regarding various logic conditions and the information or answers determine the path to be taken to the next step. Therefore, the words "yes" or "no" is written adjacent to the arrows extending from each diagonal shaped lock to indicate the logic conditions or how the question contained within the diagonal shaped block has been answered and the resulting path to be followed. The rectangles contain steps performed or instructions given to the various logic or memory elements involved. The arrows on the connecting line indicate the direction of flow of the steps through the diagram.

Figure 2:
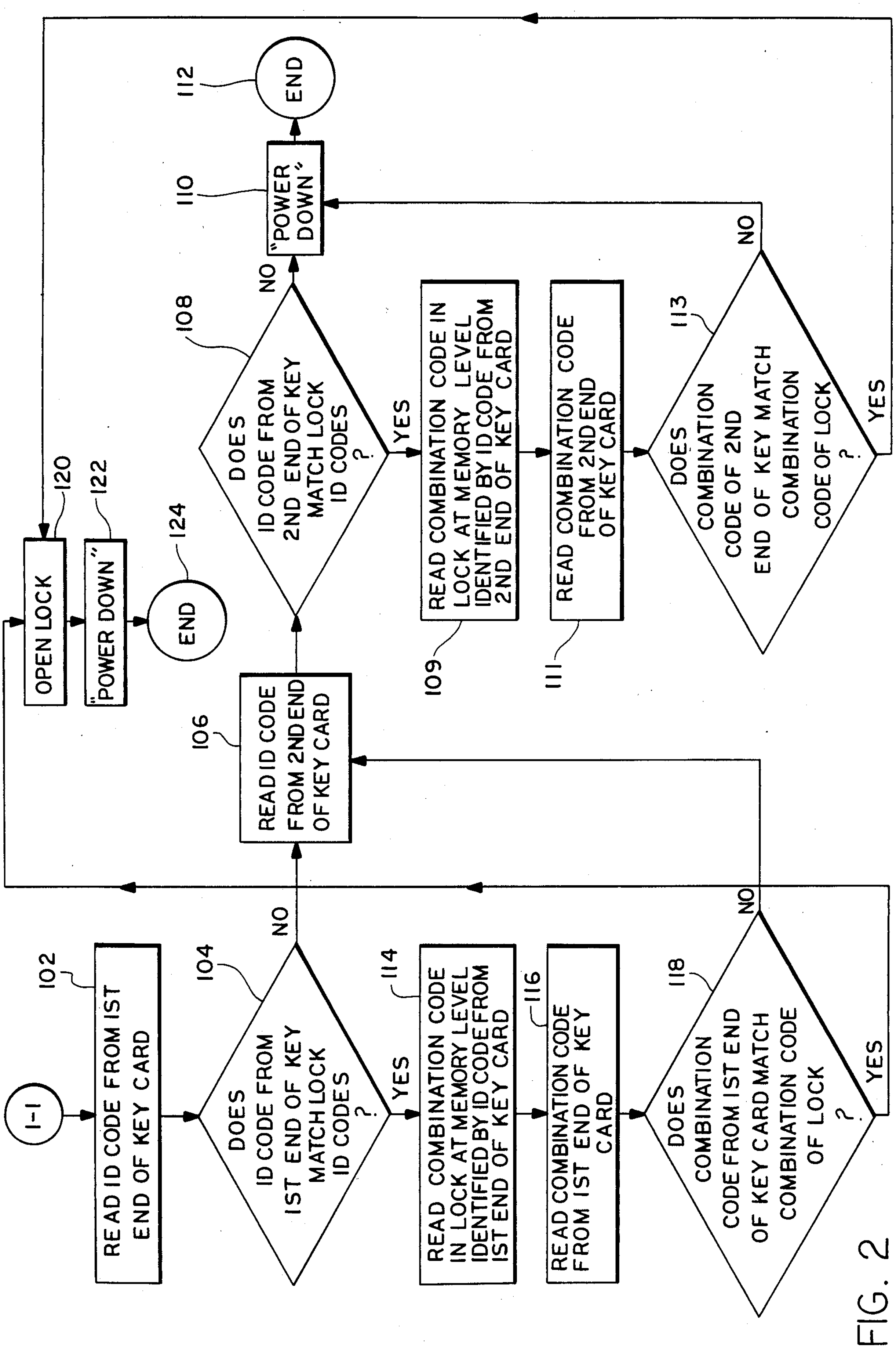
FIG. 2 is a flow diagram showing the operation of the present invention.

Referring to FIG. 2, the security system operation begins by inserting the user key 10 into the lock card reader 24. The card reader 14 reads the identification code on the first inserted end 16 on the front 12 of key 10 (block 102). Control unit 28 signals comparator 24 to compare the key identification code to all of the identification codes in the lock memory 22 (block 104). If the identification code from the first end 16 of the key 10 does not match any of the lock identification codes, the key 10 must be removed and reinserted such that the card reader 22 reads the identification code from the second end 18 on the back 14 of the key 10 (block 106). Control unit 28 signals comparator 24 to compare this key identification code to all of the lock identification codes in multi-level memory 22 (block 108). If this second identification code does not match any lock identification codes, the lock removes the power from the lock except that necessary to maintain the data in multi-level memory 22 (block 110). This sequence of events is called the "power down" sequence. After the lock performs the "power down" sequence, the operation of the security system is completed (block 112).

If the identification code on the second end 18 of the key 10 does match a lock identification code, control unit 36 signals multi-level memory 22 to transmit the combination code at the memory level identified by the identification code from the second end of the key to comparator 24 (block 109). Control unit 36 signals card reader 24 to read the combination code from the second end 18 of the key (block 111). The control unit 36 further signals card reader 22 to transmit this combination code to comparator 28. The combination codes from the key and the lock are then compared (block 113). If the two combination codes match, control unit 36 signals lock mechanism 34 to open (block 120). After signaling the lock mechanism, the control unit performs the "power down" sequence (block 122), thus completing the operation of the system (block 124).

However, if the two combination codes do not match, the "power down" sequence is performed (block 110) without signaling the lock mechanism 34 and the system completes its operation (block 112).

All the previous steps occur if the first identification code from the first end of the key 10 does not match any of the identification codes in the lock and the card is reversed and a second identification code read. However, if the identification code from the first end 16 of the key 10 does match an identification code in the lock, control unit 36 signals memory 22 to transmit a combination code from from the memory level identified by the key identification code to comparator 24 (block 114). Control unit 36 then signals card reader 24 to read the combination code from the first end 16 of the key (block 116). The control unit 36 further signals card reader 24 to transmit this combination code to comparator 24. Control unit 36 then signals comparator 24 to compare the lock and key combination codes (block 118). If the two combination codes match, the lock mechanism 30 is enabled as previously described (block 120) and the "power down" sequence is performed (block 122), thus completing the operation of the system (block 124). If the two combination codes do not match, the key 10 must be removed and reinserted such that card reader 22 may read the identification code from the second end 18 of the key (block 106) and performs the steps as previously described.

The system described above may be incorporated in a more sophisticated system which includes a plurality of different function keys, each having an installation code and a function code. With the exception of the "user key", every key is required to have a function code and an installation code. If such key installation code does not match the lock installation code, the function requested will not be performed. Therefore, the operation of this system will include the use of function table 26 and installation code memory 32 shown in FIG. 1.

Figure 3:
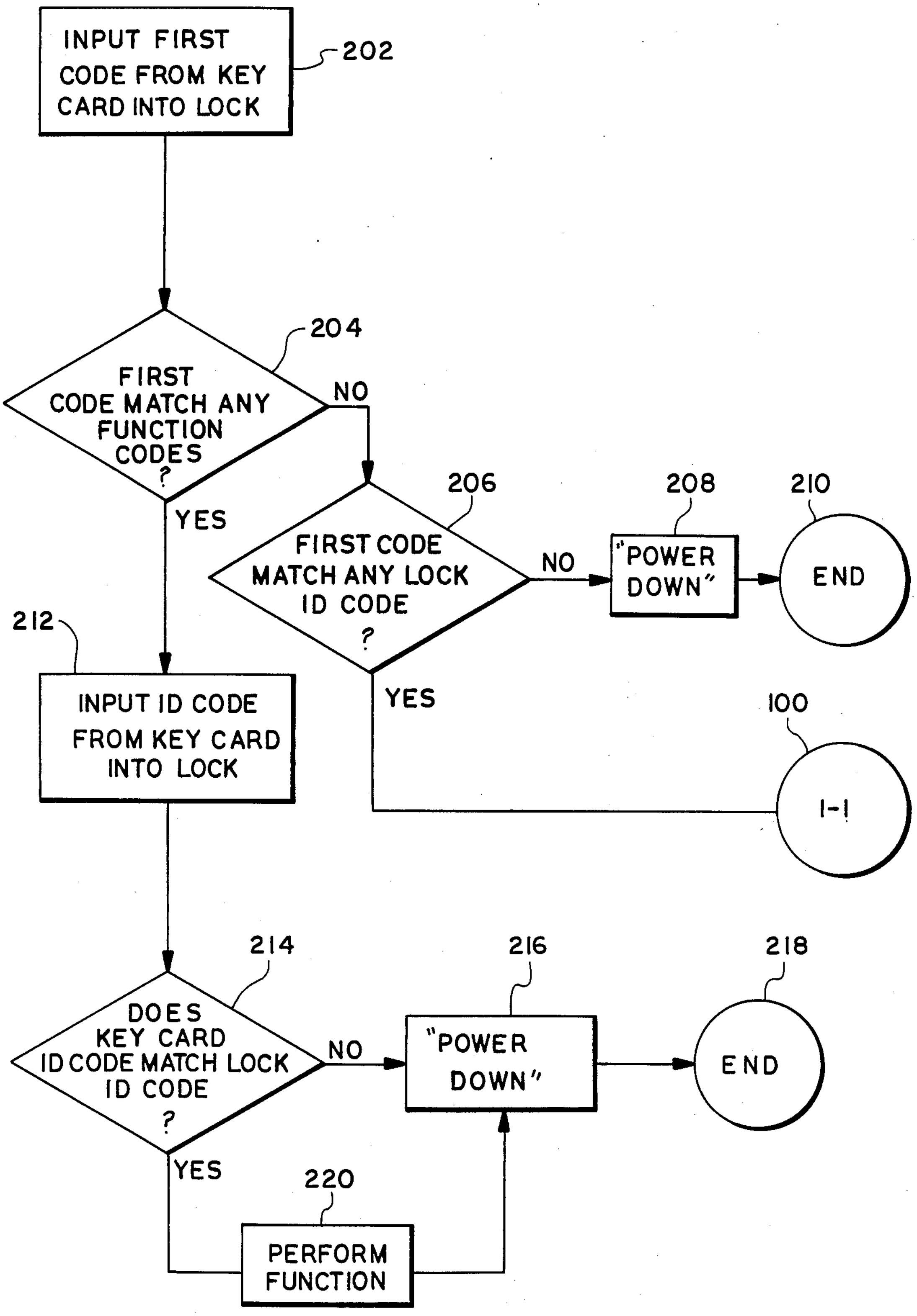
FIG. 3 is a flow diagram showing an additional operation of the present invention.

Referring to FIG. 3, the operation begins when the key 10 is inserted into the lock and control unit 36 signals card reader 24 to read the first code from the first end 16 of key 10 into the lock (block 202). Control unit 36 signals card reader 24 to transmit the first code into comparator 28. The Control unit 36 further signals function table to transmit each function code into comparator 28. If the first code does not match any function codes in function table 26 (block 204), control unit 36 signals multi-level memory 22 to transmit each identification code to comparator 28. If the first code matches any lock identification code (block 206), the security system performs all of the steps as previously described by FIG. 2. If the identification code does not match any of the lock identification codes, the lock performs the "power down" sequence (block 208), thus completing the operation of the system (Block 210).

If the first code does match a function code in function table 26 (block 204), control unit 36 signals card reader 24 to read the installation code on the key 10 (block 212). Control unit 36 further signals card reader 24 to transmit the key installation code to comparator 28. The control unit 36 also signals lock installation code memory 32 to transmit the lock installation code to comparator 28 (block 214). If the key installation code does not match the lock installation codes, the lock performs the "power down" sequence (block 216) thus completing the operation of the system (block 218). If the installation code does match the lock installation code, the lock performs the function identified by the key function code (block 220) and upon completion of the function performs the "power down" sequence (block 216) thus completing the operation of the system (Block 218).

From the foregoing, it has been shown that the present invention provides a system which allows a single key to access more than one lock with different code combinations, and further allowing a single key to change the lock combination codes of two different locks and different memory levels. Although a specific embodiment has been illustrated and described, various modifications and changes may be made without departing from the spirit and scope of the invention.

What is claimed is:

1. An electronic security system having a plurality of locks comprising:
   at least one electronic user key, said user key having a first identification code and a first combination code on one end of said user key, and a second identification code and a second combination code on a second end of said user key.

2. The electronic security system as defined in claim 1 wherein:
   said plurality of locks each include at least one combination code and a comparing means for comparing a selected lock code with a key code; and
   said comparing means compares the combination code on the first end of the key with the lock combination code, and compares the combination code on the second end of the key with the lock combination code if the combination code on the first end of the key does not match any lock combination codes.

3. The electronic security system as defined in claim 2 wherein:

said plurality of locks each further include a multi-level memory for storing the combination codes, each level identified by an identification code;

said comparing means compares the identification code on the first end of the key with all of the lock identification codes, and compares the identification code on the second end of the key with the lock identification code if the identification code on the first end of the key does not match any lock identification code; and the comparing means compares the identification codes before the combination codes.

4. The electronic security system as defined in claim 3 further comprising:

at least one function key having an installation code and a function code;

said plurality of locks each further including a function table for storing at least one predefined function identified by a function code and a means for storing an installation code;

said comparing means compares the key function code with all of the function codes in the function table, and compares the key installation code with the lock installation code;

the lock performing the function requested by the key if the key function code matches a functon code in the function table, and if the key installation code matches the lock installation code.

* * * * *

UNITED STATES PATENT AND TRADEMARK OFFICE

CERTIFICATE OF CORRECTION

PATENT NO. : 4,677,284

DATED : June 30, 1987

INVENTOR(S) : Leonard J. Genest

It is certified that error appears in the above-identified patent and that said Letters Patent are hereby corrected as shown below:

In the specification at column 2, line 45, delete "comprraring" and insert --comparing--

Signed and Sealed this

Seventeenth Day of November, 1987

*Attest:*

DONALD J. QUIGG

*Attesting Officer* *Commissioner of Patents and Trademarks*